United States Patent
Oshins et al.

(10) Patent No.: US 6,598,105 B1
(45) Date of Patent: Jul. 22, 2003

(54) INTERRUPT ARBITER FOR A COMPUTING SYSTEM

(75) Inventors: Jacob K. Oshins, Seattle, WA (US); Andrew J. Thornton, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/290,853

(22) Filed: Apr. 13, 1999

(51) Int. Cl.[7] .............................................. G06F 13/26
(52) U.S. Cl. ......................... 710/264; 710/266; 703/21
(58) Field of Search ................................. 710/260–266, 710/119, 104, 114, 123, 268, 116, 269, 8; 713/324, 200, 300; 714/42; 709/226, 220

(56) References Cited

U.S. PATENT DOCUMENTS

| | | | | |
|---|---|---|---|---|
| 4,628,480 A | * | 12/1986 | Floyd ............................. | 710/8 |
| 5,369,769 A | * | 11/1994 | Martin et al. ................ | 710/269 |
| 5,390,350 A | * | 2/1995 | Chung et al. ................ | 713/322 |
| 5,535,420 A | * | 7/1996 | Kardach et al. .............. | 710/48 |
| 5,548,762 A | * | 8/1996 | Creedon et al. ............. | 710/260 |
| 5,568,643 A | * | 10/1996 | Tanaka ........................ | 710/266 |
| 5,809,329 A | * | 9/1998 | Lichtman et al. ............... | 710/8 |
| 6,105,146 A | * | 8/2000 | Tavallaei et al. ................ | 714/2 |
| 6,170,020 B1 | * | 1/2001 | Blakeney et al. ............. | 710/10 |
| 6,219,742 B1 | * | 4/2001 | Stanley ........................ | 710/260 |
| 6,219,744 B1 | * | 4/2001 | Bredin et al. ................ | 710/262 |
| 6,308,248 B1 | * | 10/2001 | Welker et al. .............. | 711/209 |
| 6,457,069 B1 | * | 9/2002 | Stanley ........................... | 710/8 |

* cited by examiner

Primary Examiner—Paul R. Myers
Assistant Examiner—Kandasamy Thangavelu
(74) Attorney, Agent, or Firm—Leydig, Voit & Mayer, Ltd

(57) ABSTRACT

An interrupt arbiter for a computer is described. The arbiter allocates interrupt resources to a plurality of devices within a computer such as a modem, keyboard, video controller, serial port, PCMCIA card, etc. As devices request interrupt resources, the inventive arbiter uses the Advanced Configuration and Power Interface (ACPI) to allocate interrupt resources based on the actual hardware topology of the computer. The improved arbiter allocates the interrupt resources by using configuration information that conforms to the ACPI specification and that describes the underlying connection circuitry, such as the multiplexors, routers, switches, etc., that communicates interrupt signals generated by the devices. In addition, the arbiter reconfigures connection circuitry of the computing system when necessary in order to improve the allocation of interrupt resources.

17 Claims, 3 Drawing Sheets

INTERRUPT ARBITER FOR A COMPUTING SYSTEM

FIELD OF THE INVENTION

This invention relates generally to the field of data processing and more particularly to an interrupt arbiter for managing interrupt resources in a computing system.

BACKGROUND

Devices inside a computer often need to "interrupt" the processor when they need immediate attention. This is accomplished by generating an interrupt signal to inform the processor that an event has occurred. For example, a keyboard generates an interrupt signal with each keystroke. Device interrupts are fed to the processor using a special piece of hardware called an interrupt controller that receives the interrupt signals from the devices and correctly presents them to the processor.

An operating system running on the computer is responsible for assigning the inputs on the interrupt controller to the devices. Often, proper performance of the computer greatly depends upon the allocation of the computer's interrupt resources. In general, a unique interrupt resource is assigned to each device. Because of the way the computer is designed it is generally not feasible for more than one device to use an interrupt at one time. If more than one device uses an interrupt at one time, the processor can respond to the wrong event and may respond to the wrong device at the wrong time. In some circumstances, however, it may be possible to share the inputs on the interrupt resources between the multiple devices depending on the character of the devices.

Currently, various modules within the operating system are responsible for allocating the interrupt resources. Each device driver specifies a set of ranges and range types that represent all of the possible resources the device could use. The operating system groups these ranges into an interrupt range list such as {{I/O 60-60, 64-64, Interrupt 1}, {I/O 60-60, 64-64, no interrupt}}. In this example, if the operating system were to select the set with no interrupt, it would be forced to "poll" the corresponding device. If, however, the operating system selected the first set then the requesting device would use interrupt 1 to inform the operating system that it needed attention.

Typically, the interrupt resources are allocated via boot code of a computer. If a device subsequently requests an interrupt resource, the operating system uses the current state of the interrupt range list to discover whether a requested range conflicts with a previously allocated range. Thus, in conventional systems the allocation of interrupt resources is a function of previously allocated resources and often produces less than adequate results.

In addition, allocating interrupt resources has become more difficult as the number and variety of devices that may be connected to the computer has expanded. Furthermore, new computers support a "Plug and Play" framework that seeks to automatically configure devices as they are added to the computer. For these reasons, and for other reasons stated below which will become apparent to those skilled in the art upon reading and understanding the present specification, there is a need in the art for an improved arbitration mechanism that more effectively allocates interrupt resources.

SUMMARY

An interrupt arbiter for a computer is described. The arbiter allocates interrupt resources to a plurality of devices within a computer such as a modem, keyboard, video controller, serial port, PCMCIA card, etc. As devices request interrupt resources, the inventive arbiter uses the Advanced Configuration and Power Interface (ACPI) to allocate interrupt resources based on the actual hardware topology of the computer. The improved arbiter allocates the interrupt resources by using configuration information that conforms to the ACPI specification and that describes the underlying connection circuitry, such as the multiplexors, routers, switches, etc., that communicates interrupt signals generated by the devices. In one embodiment the arbiter retrieves the configuration information from the computer's basic input/output system (BIOS). In addition, the arbiter reconfigures connection circuitry of the computing system when necessary in order to improve the allocation of interrupt resources.

DETAILED DESCRIPTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. The first section describes the hardware and the operating environment that is suitable for use with the inventive interrupt arbiter. The second section provides a detailed description of the inventive system. The third section provides methods for operating an exemplary embodiment of the invention. Finally, the fourth section provides a conclusion of the detailed description.

Hardware and Operating Environment

Figure 1:
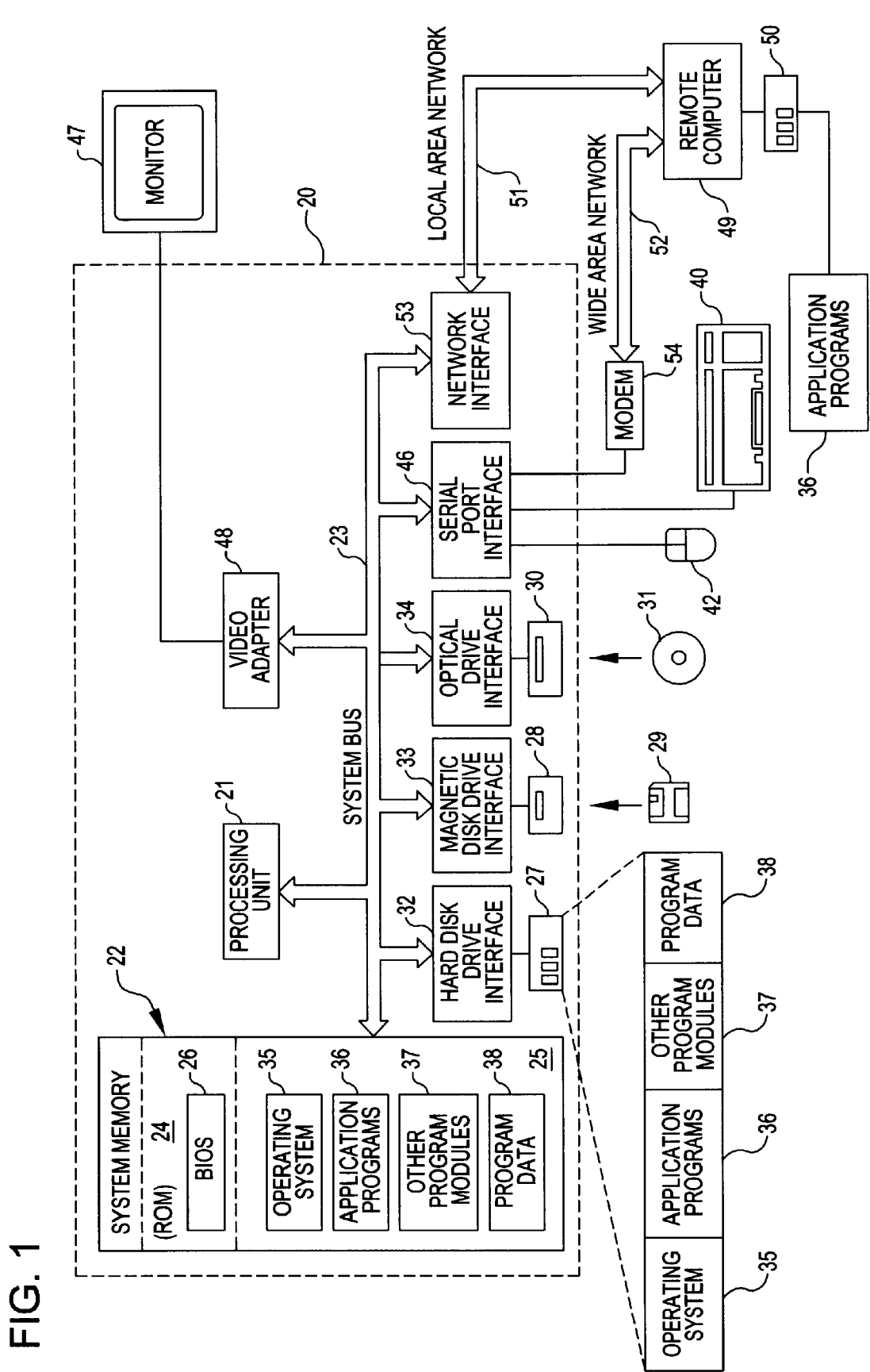
FIG. 1 is a diagram of the hardware and operating environment of a suitable computer in conjunction with which embodiments of the invention may be practiced.

FIG. 1 is a diagram of computer suitable for implementing an interrupt arbiter that operates according to the various embodiments of the invention. The invention is described in the general context of computer-executable instructions, such as program modules, being executed by a computer, such as a personal computer. Generally, program modules include routines, programs, objects, components, data structures, etc., that perform particular tasks or implement particular abstract data types.

The exemplary hardware and operating environment of FIG. 1 includes a general purpose computing device in the form of a computer 20 having processing unit 21, system memory 22, and system bus 23 that operatively couples various system components including system memory 22 to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. Basic input/output system (BIOS) 26 contains routines that help to transfer information between elements within computer 20, such as during start-up, and is stored in ROM 24. Computer 20 further includes hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored by hard disk 27, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to processing unit 21 through serial port interface 46 that is coupled to the system bus, but may be connected by other interfaces, such as a parallel port, game port, or a universal serial bus (USB). Monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
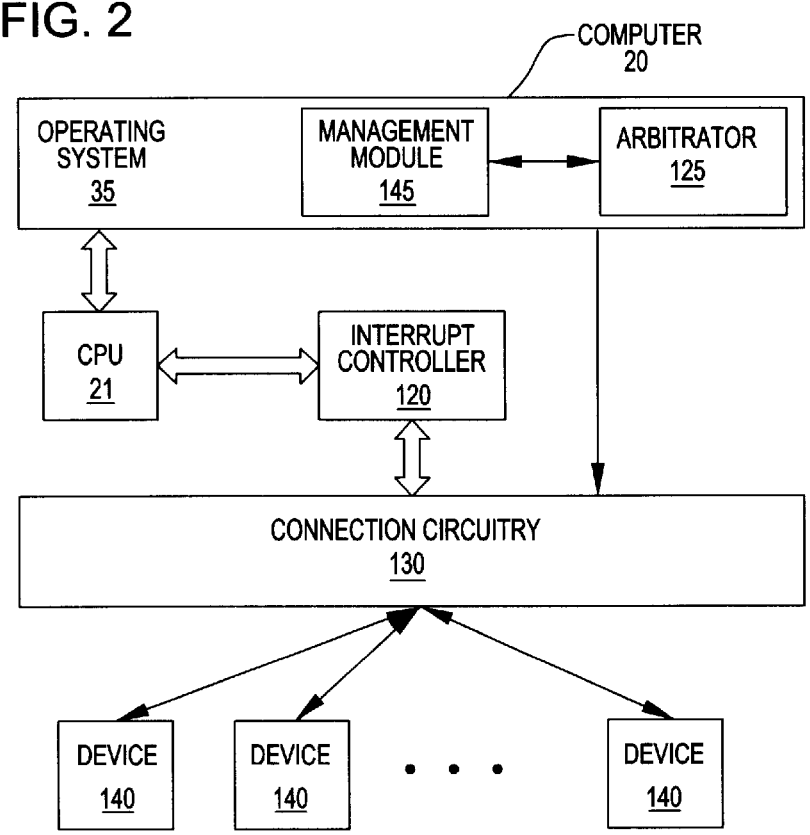
FIG. 2 is a block diagram illustrating one embodiment of the computer of FIG. 1 having an interrupt arbiter according to the invention.

In order to further describe the invention, FIG. 2 is a block diagram illustrating certain elements of computer 20 that are not illustrated in FIG. 1. For example, as shown in FIG. 2, computer 20 includes connection circuitry 130 that receives interrupt signals from devices 140 that represent various components within computer 20 including modem 54, keyboard 40, video adapter 48, serial port 46, a PCMCIA card, etc.

Connection circuitry 130 communicates the interrupt signals to interrupt controller 120 and may comprise various electronic components such as multiplexors, routers, switches, etc. Interrupt controller 120 receives the interrupt signals from connection circuitry 130, processes the interrupt signals, and informs CPU 21 when devices 140 require attention. Alternatively, connection circuitry 130 provides the interrupt signals directly to CPU 21 and bypasses interrupt controller 120.

CPU 21 and interrupt controller 120 have a limited set of interrupt resources that can be allocated to satisfy the requirements of devices 140. Arbiter 125 allocates the interrupt resources to devices 140 as devices 140 request interrupts. This may occur at different times such as when computer 20 is initially started or when a user has added a device to computer 20 without turning off computer 20, as is often the case with laptop computers.

According to the invention, arbiter 125 reads configuration information from BIOS 26 (FIG. 1) that describes connection circuitry 130. As illustrated in detail below, arbiter 125 operates in conjunction with management module 145 to use this information for allocating interrupt resources to devices 140 and, if necessary, to reconfigure connection circuitry 130 in order to generate an improved resource allocation.

In one embodiment, computer 20 and the configuration information conform to the Advanced Configuration and Power Interface (ACPI) specification that defines a standard interface to integrate power management features throughout a computing system. Generally speaking, the ACPI specification enables operating system 35 to control the amount of power given to devices 140. With ACPI, operating system 35 can turn off devices 140 when they are not in use. Because the ACPI specification provides a standard way of describing connection circuitry 130, arbiter 125 is able to reconfigure connection circuitry 130 to improve interrupt resource allocation.

Methods of an Exemplary Embodiment of the Invention

In the previous section, a system level overview of the operation of exemplary embodiments of the invention was described. In this section, the particular methods performed by the exemplary embodiments are described by reference to a flowchart. The methods to be performed by the embodiments constitute computer programs made up of computer-executable instructions. Describing the methods by reference to a flowchart enables one skilled in the art to develop such programs including such instructions to carry out the methods on suitable computers from computer-readable media.

Figure 3:
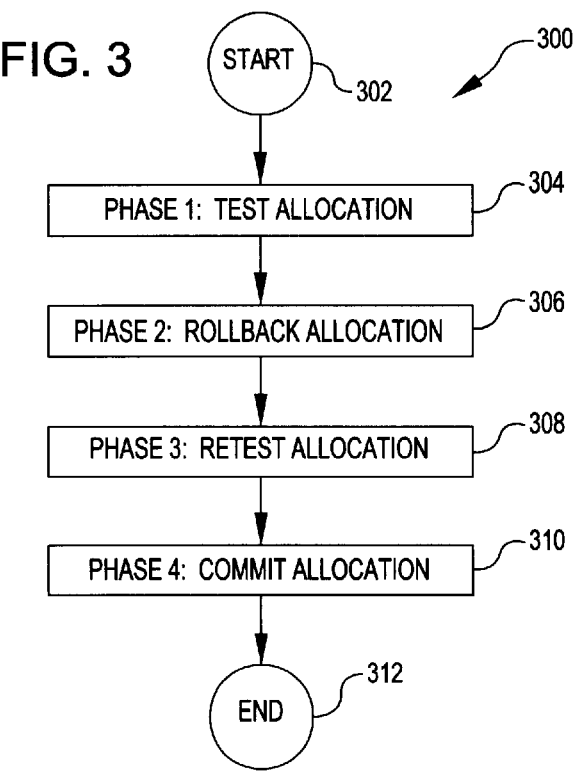
FIG. 3 is a flowchart illustrating one exemplary method of operation of the interrupt arbiter for managing interrupt resources in a computer.

FIG. 3 is a flowchart 300 illustrating one exemplary method of operation of arbiter 125 for managing interrupt resources in computer 20. In order to manage interrupt resources according to the invention, arbiter 125 begins with block 302, proceeds to block 304 which represents the first phase of the allocation process: the test allocation phase.

During test allocation phase 304, the management module 145, which in one embodiment is a Plug and Play manager, chooses a set of devices 140 which arbiter 125 is to take under consideration. This set may include only one device 140 or most of the devices 140 within computer 20. When there are more devices 140 for consideration, arbiter 125 has more flexibility for re-assigning interrupts that are currently in use. This, however, increases the computational complexity of the assignment. For this reason, management module 145 may limit the number of devices 140 that may be considered in order to reduce the time required for computer 20 to boot.

For example, when a device 140 is hot-plugged into a PCMCIA slot, management module 145 requests that arbiter 125 allocate an interrupt for device 140 without considering other devices 140. If arbiter 125 fails to find an acceptable free interrupt for the new device 140, management module 145 calls the drivers for other interrupt consuming devices 140 and inquires as to whether the devices 140 can stop using the assigned interrupt. Management module 145 then calls the arbiter 125 again with the larger set of devices for consideration. At this point arbiter 145 is likely to respond that there would be a possible allocation, given that some of the other devices 140 now under consideration could be moved or consolidated.

Next, arbiter 125 frees all interrupt resources allocated to devices 140 that are currently being considered for reallocation based on communication from management module 145. After freeing the resources, arbiter 125 accesses BIOS 26 and reads configuration information that describes connection circuitry 130. In one embodiment, this configuration information conforms to the ACPI specification.

Based on this configuration information, arbiter 125 generates a list of "interrupt ranges" for devices 140 by determining a suitable range of interrupt resource for each device 140. A range list is a sorted list of I/O port or memory address ranges that describes a computing resource, including interrupts, in which no two ranges overlap. Each range specifies a contiguous range of addresses, but the range list can contain ranges that are not contiguous with any other range in the range list.

For example, one device 140 may request an interrupt resource that falls within the range of 0 through 255. The configuration information may, however, indicate that the requesting device 140 shares certain components of connection circuitry 130 with another device 140 that has been allocated interrupt 127. In this scenario arbiter 125 determines that the second device must be allocated the same interrupt.

As another example, arbiter 125 may determine from the configuration information that the connection circuitry 130 can be reconfigured such that a particular device falls into a different resource range. As these examples illustrate, arbiter 125 uses the configuration information to improve the allocation of interrupt resources. This process is repeated for each device 140 until arbiter 125 finds a solution that satisfies the requirements of each device 140. This process is illustrated in detail below in reference to FIG. 4.

After determining suitable interrupt ranges for each device 140, arbiter 125 proceeds to block 306 and communicates the solution to management module 145. Management module 145 determines whether the solution proposed by arbiter 125 is reasonable based on any changes that are required to connection circuitry 130. If the solution is not acceptable, arbiter 125 returns to block 304 and generates another solution.

If one of the tested solutions is acceptable to management module 145, arbiter 125 proceeds to block 308. In the retest phase, management module 145 directs arbiter 125 to rebuild the chosen solution using the information that arbiter 125 stored during the test allocation phase 304. Block 310 represents the commit allocation phase in which arbiter 125 makes the proposed changes to connection circuitry 130 such as reprogramming a multiplexer, etc. This guarantees that the underlying hardware will be correctly configured when the devices 140 begin operation.

Figure 4:
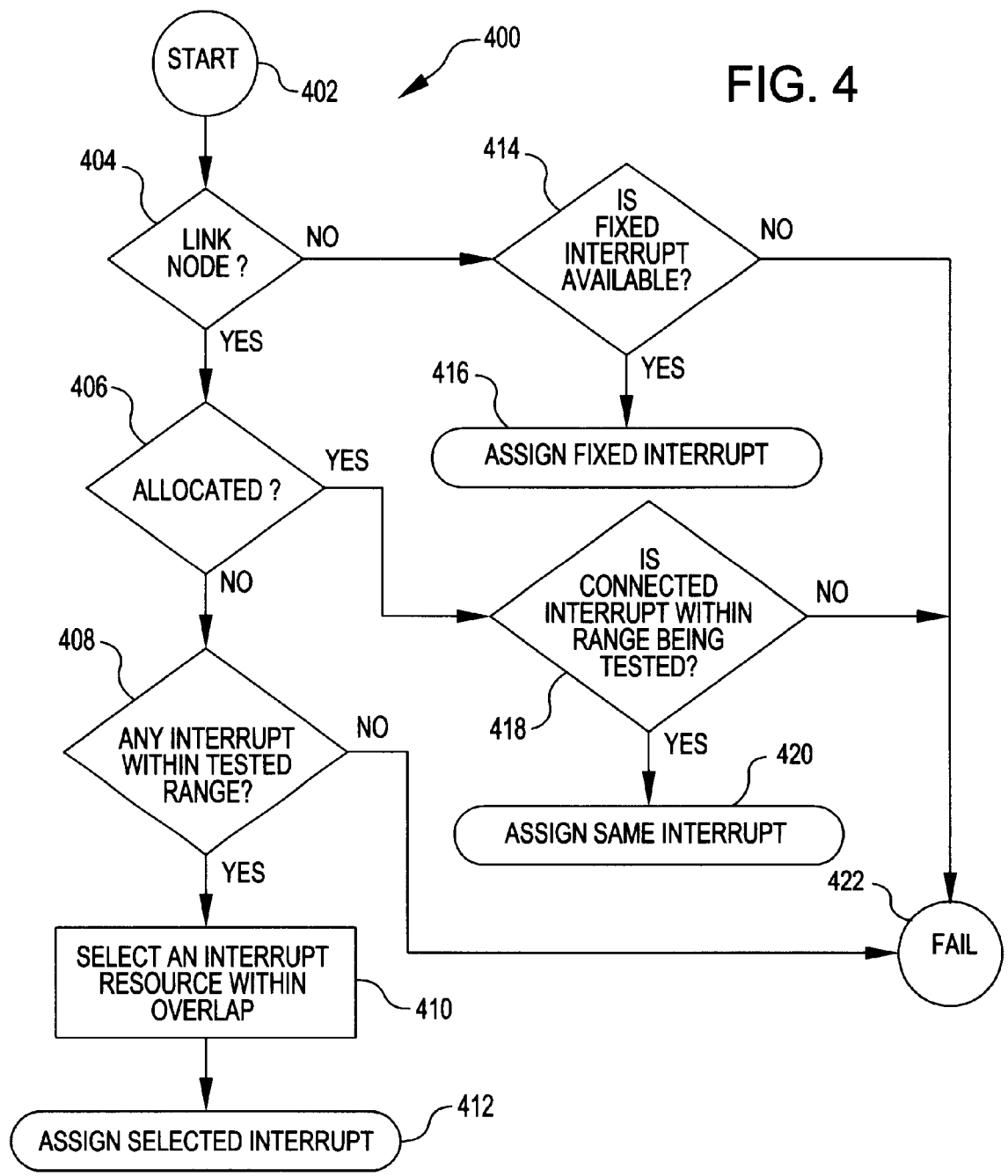
FIG. 4 is a flowchart illustrating a test allocation phase of the flowchart of FIG. 3 during which the interrupt arbiter determines suitable interrupt ranges for the computer.

FIG. 4 is a flowchart 400 illustrating in detail test allocation phase 302 of flowchart 300 described above. The process illustrated in FIG. 4 is repeated for each device 140 of computer 20 in order to determine suitable interrupt ranges for each device 140.

Arbiter 125 begins with block 402, proceeds to block 404 and determines whether the particular device 140 is connected to interrupt controller 120 via a "link node" within connection circuitry 130. The term link node refers to any underlying hardware component of connection circuitry 130, such as a multiplexor, that can be reprogrammed or changed in any manner that allows the interrupt signal to be carried via several different interrupt inputs of interrupt controller 20.

If the current device 140 is not connected to a link node then arbiter 125 proceeds to block 414 and determines whether the requested interrupt is available. If the requested interrupt is not available then arbiter 125 proceeds to block 422 and fails the proposed solution for the interrupt ranges. If the requested interrupt resource is available then arbiter 125 simply assigns the requested interrupt resource in block 416 and terminates.

If the current device 140 is connected to a link node then arbiter 125 proceeds from block 404 to block 406 and determines whether the link node has been previously configured for a different device 140. If so, arbiter 125 proceeds to block 418 and determines whether the interrupt resource that is assigned to the link node falls within the range requested by the current device 140 based on the current configuration of the link node. If so, arbiter 125 proceeds to block 420, assigns the current interrupt resource to the device 140 and terminates. If not, the proposed solution is unworkable, i.e., the interrupt resource requirements of the device cannot be satisfied. In this situation arbiter 125 proceeds from block 418 to 422 and fails the proposed solution for the interrupt ranges.

Referring again to block 406, when the link node has not been previously configured for a different device 140, then arbiter 125 determines whether any of the interrupt resources supported by the link node fall within the range requested by the device. If not, arbiter 125 proceeds to block 422 and fails the proposed solution for the interrupt ranges. If so, arbiter 125 proceeds to block 410 and selects an interrupt resource that falls within the range supported by the link node and within the range requested by the device. Next, arbiter 125 proceeds to block 412 and assigns the selected interrupt resource to device 140 and terminates. Arbiter 125 repeatedly invokes the method illustrated in FIG. 4 to generate a proposed solution for ratification by management module 145 as described above.

The particular methods for an improved allocation technique have been described. The methods have been shown by reference to flowcharts that describe various embodiments of the interrupt resource arbiter.

Conclusion

Various embodiments of an arbiter for allocating interrupt resources in a computer have been described. Unlike conventional systems, the improved arbiter uses the Advanced Configuration and Power Interface (ACPI) to allocate interrupt resources based on the hardware topology of the computer. The arbiter retrieves configuration information conforming to the ACPI specification from the computer's basic input/output system (BIOS). The configuration information describes the connection circuitry, such as the multiplexors, routers, switches, etc., that communicates interrupt signals generated by the devices. The arbiter allocates the interrupts resources as a function of this configuration information and may, if necessary, reconfigure the connection circuitry of the computing system in order to improve the allocation.

Although specific embodiments have been illustrated and described herein, it will be appreciated by those of ordinary skill in the art that any arrangement which is calculated to achieve the same purpose may be substituted for the specific embodiments shown. Therefore, this application is intended to cover any adaptations or variations of the present invention.

We claim:

1. A computer comprising an arbiter for allocating interrupts to a plurality of devices, wherein the arbiter, when allocating the interrupts, reconfigures connection circuitry that communicates interrupt signals from the devices to an interrupt controller in response to a request by a first device by:

trying to find an acceptable free interrupt for the first device;
if an acceptable free interrupt is not available, then:
freeing at least one interrupt currently allocated to a second device;
accessing configuration information that describes the connection circuitry; and
assigning the first device and the second device to interrupts based upon the configuration information.

2. The computer of claim 1, wherein the configuration information conforms to an Advanced Configuration and Power Interface (ACPI).

3. A computer comprising:
an interrupt controller to receive interrupt signals from a plurality of devices;
connection circuitry to communicate the interrupt signals from the devices to the interrupt controller; and
an arbiter to allocate interrupts to the devices, wherein the arbiter is capable of reconfiguring the connection circuitry when allocating the interrupts in response to a request by a first device by:
trying to find an acceptable free interrupt for the first device;
if an acceptable free interrupt is not available, then:
freeing at least one interrupt currently allocated to a second device;
accessing configuration information that describes the connection circuitry; and
assigning the first device and the second device to interrupts based upon the configuration information.

4. The computer of claim 3, wherein the connection circuitry is a multiplexor.

5. The computer of claim 3, wherein the arbiter is a software module within an operating system executing on the computer.

6. The computer of claim 3, wherein the configuration information is stored in a basic input/output system (BIOS).

7. The computer of claim 3, wherein the configuration, information conforms to an Advanced Configuration and Power Interface (ACPI).

8. The computer of claim 3, wherein the computer conforms to an Advanced Configuration and Power Interface (ACPI).

9. A computing method for allocating interrupt resources comprising:
reconfiguring connection circuitry that couples a plurality of devices to an interrupt controller of a computer in response to a request for an interrupt by a first device by:
trying to find an acceptable free interrupt for the first device;
if an acceptable free interrupt is not available, then freeing at least one interrupt currently allocated to a second device; and
allocating interrupt resources to the devices as a function of the reconfiguration by assigning the first device and the second device to interrupts based upon the configuration information.

10. The method of claim 9, wherein the configuration information conforms to an Advanced Configuration and Power Interface (ACPI).

11. The method of claim 9, wherein the configuration information is stored in a basic input/output system (BIOS).

12. A computer-readable medium having computer-executable instructions to cause a computer to perform the method of claim 9.

13. A method for allocating interrupt resources to a plurality of devices that are coupled to an interrupt controller of a computer via connection circuitry, the method comprising:

releasing interrupt resources previously allocated to the plurality of devices;
 determining an interrupt range for each of the devices;
 testing the interrupt ranges;
 repeating the determining step when the testing step fails;
 allocating interrupt resources to the devices when the testing step succeeds; and
 reconfiguring the connection circuitry as a function of the allocation.

14. The method of claim 13, wherein reconfiguring the connection circuitry includes reading configuration information that describes the connection circuitry.

15. The method of claim 14, wherein the configuration information conforms to an Advanced Configuration and Power Interface (ACPI).

16. The method of claim 14, wherein the reading configuration information includes accessing a basic input/output system (BIOS).

17. A computer-readable medium having computer-executable instructions to cause a computer to perform the method of claim 13.

* * * * *